US010248435B2

(12) United States Patent
Aratsu et al.

(10) Patent No.: US 10,248,435 B2
(45) Date of Patent: Apr. 2, 2019

(54) SUPPORTING OPERATION OF DEVICE

(71) Applicant: International Business Machines Corporation, Armonk, NY (US)

(72) Inventors: Taku Aratsu, Tokyo (JP); Toshiyuki Komoda, Tokyo (JP); Yohei Umehara, Kawasakishi (JP); Satoshi Yokoyama, Chiba (JP)

(73) Assignee: International Business Machines Corporation, Armonk, NY (US)

( * ) Notice: Subject to any disclaimer, the term of this patent is extended or adjusted under 35 U.S.C. 154(b) by 215 days.

(21) Appl. No.: 14/837,030

(22) Filed: Aug. 27, 2015

(65) Prior Publication Data

US 2017/0060603 A1 Mar. 2, 2017

(51) Int. Cl.

| | |
|---|---|
| ***G06F 9/00*** | (2006.01) |
| ***G06F 9/24*** | (2006.01) |
| ***G06F 15/177*** | (2006.01) |
| ***G06F 9/445*** | (2018.01) |
| ***G05F 1/66*** | (2006.01) |

(52) U.S. Cl.
CPC ............ *G06F 9/44505* (2013.01); *G05F 1/66* (2013.01)

(58) Field of Classification Search
CPC .......................................................... G06F 9/44
See application file for complete search history.

(56) References Cited

U.S. PATENT DOCUMENTS

| | | | | |
|---|---|---|---|---|
| 8,312,459 | B2 * | 11/2012 | Smith | G06F 9/5072 718/104 |
| 9,009,101 | B2 * | 4/2015 | Bhatt | G06F 17/30368 707/609 |
| 2004/0179524 | A1 * | 9/2004 | Sasagawa | H04L 45/04 370/389 |
| 2011/0023049 | A1 | 1/2011 | Dettinger et al. | |
| 2011/0126041 | A1 * | 5/2011 | Matsubara | H04L 45/22 714/4.11 |
| 2011/0276630 | A1 * | 11/2011 | Ekblom | H04L 67/104 709/204 |

(Continued)

FOREIGN PATENT DOCUMENTS

| | | | |
|---|---|---|---|
| JP | 2011215977 | A | 10/2011 |
| WO | 2014120893 | A1 | 8/2014 |

OTHER PUBLICATIONS

Nii et al., "Power Electronics Technology that Supports Smart Grid", Fuji Electric Co., Ltd, vol. 84, No. 3, 2011, pp. 203-208.

*Primary Examiner* — Mohammed H Rehman
(74) *Attorney, Agent, or Firm* — Isaac J. Gooshaw; Maeve M. Carpenter

(57) ABSTRACT

A computer supports an operation by an operator of a target device. The computer stores a first topology indicating dependency relationship of a plurality of device types including a device type of the target device. The computer generates a second topology indicating dependency relationship of a plurality of devices including the target device, by performing, based on the first topology, a topology discovery for the plurality of devices. Each of the plurality of devices has any one of the plurality of device types. The computer provides an operation sequence of the plurality of devices to the operator. The operation sequence is generated based on the second topology.

20 Claims, 11 Drawing Sheets

(56) References Cited

U.S. PATENT DOCUMENTS

| | | | | |
|---|---|---|---|---|
| 2013/0091313 | A1* | 4/2013 | Liu | G06F 13/4081 710/302 |
| 2013/0246683 | A1* | 9/2013 | Natrajan | G06F 11/3051 710/316 |
| 2014/0129690 | A1* | 5/2014 | Jaisinghani | G06F 9/5061 709/222 |
| 2014/0177476 | A1* | 6/2014 | Perrett | H04L 41/12 370/255 |
| 2015/0127815 | A1* | 5/2015 | Billore | H04L 41/145 709/224 |
| 2015/0365350 | A1* | 12/2015 | Xu | |
| 2016/0132806 | A1* | 5/2016 | To | G06Q 10/06313 705/7.23 |

* cited by examiner

500

Work Instruction Sheet

501 Device ID: A01

502

| Task ID | Task Target | Task Content |
|---|---|---|
| 1-1 | E01 | Notify power stoppage |
| 1-2 | E02 | Notify power stoppage |
| ... | ... | Notify power stoppage |
| 2-1 | B01 | Close |
| 2-2 | B02 | Close |
| 3-1 | D01 | Confirm current stoppage |
| 3-2 | D02 | Confirm current stoppage |
| ... | ... | Confirm current stoppage |
| 4-1 | A01 | Replace device |
| 5-1 | B01 | Open |
| 5-2 | B02 | Open |
| 6-1 | D01 | Confirm current flow |
| 6-2 | D02 | Confirm current flow |
| ... | ... | Confirm current flow |
| 7-1 | E01 | Notify power restoration |
| 7-2 | E02 | Notify power restoration |
| ... | ... | Notify power restoration |

Work Topology

503

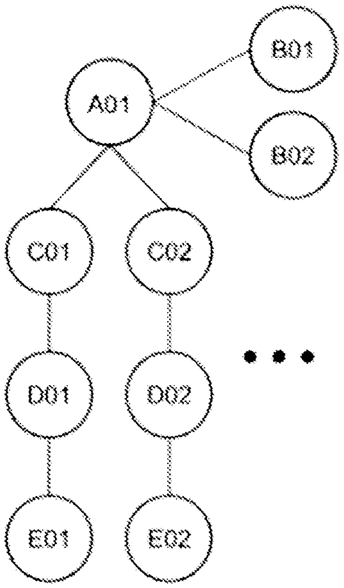

FIG. 6

SUPPORTING OPERATION OF DEVICE

BACKGROUND

The present invention relates to supporting operation of a device, and more specifically, to supporting operation by an operator of a target device.

Electric power distribution systems are often complex. They typically have many components and the connections between those components may be changed as the system is built, upgraded and repaired. Maintenance and repair of such systems is typically a necessity as components age or wear out. In order to perform such repairs safely, power is typically shut off to the area where the repairs are being performed. Therefore, topology information is used to identify the current relationships and connections among the power distribution devices, when the maintenance work is performed.

SUMMARY

According to an embodiment of the present invention, there is provided a computer-implemented method for supporting an operation by an operator of a target device. The method includes storing a first topology indicating dependency relationship of a plurality of device types including a device type of the target device. The method further includes generating a second topology indicating dependency relationship of a plurality of devices including the target device, by performing, based on the first topology, a topology discovery for the plurality of devices, each of which has any one of the plurality of device types. Furthermore, the method includes providing an operation sequence of the plurality of devices, which is generated based on the second topology, to the operator.

According to another embodiment of the present invention, there is provided an apparatus for supporting an operation by an operator of a target device. The apparatus includes a memory, coupled to the processor, and used to store a first topology indicating dependency relationship of a plurality of device types including a device type of the target device. The memory includes instructions. When executed by the processor, the instructions cause the processor to generate a second topology indicating dependency relationship of a plurality of devices including the target device, by performing, based on the first topology, a topology discovery for the plurality of devices, each of which has any one of the plurality of device types. When executed by the processor, the instructions further cause the processor to provide an operation sequence of the plurality of devices, which is generated based on the second topology, to the operator.

According to yet another embodiment of the present invention, there is provided a computer program product for supporting an operation by an operator of a target device. The computer program product includes a computer readable storage medium having program instructions embodied with the computer readable storage medium. The program instructions are executable by a processor to cause the processor to store a first topology indicating dependency relationship of a plurality of device types including a device type of the target device. The program instructions are executable by the processor to further cause the processor to generate a second topology indicating dependency relationship of a plurality of devices including the target device, by performing, based on the first topology, a topology discovery for the plurality of devices, each of which has any one of the plurality of device types. Furthermore, the program instructions are executable by the processor to cause the processor to provide an operation sequence of the plurality of devices, which is generated based on the second topology, to the operator.

BRIEF DESCRIPTION OF THE DRAWINGS

FIG. 6 depicts an example of the work instruction sheet according to exemplary embodiments of the present invention.

DETAILED DESCRIPTION

Hereinafter, certain illustrative and exemplary embodiments of the present invention will be described in detail with reference to the attached drawings.

It is to be noted that the present invention is not limited to these exemplary embodiments to be given below and may be implemented with various modifications within the scope of the present invention. In addition, the drawings used herein are for purposes of illustration, and may not show actual dimensions.

To perform maintenance work safely on power distribution devices constituting an electric power network, such as smart meters, topology information showing a relation of connection among the power distribution devices is useful. For example, to inspect a smart meter, it may be necessary to open a circuit breaker of a distribution board located upstream of the smart meter on the electric power network. The relationships and connections among the power distribution devices may change frequently, for example, by the work of adding a new device or removing an old device. Therefore, the topology information may not show the current relationships and connections among the power distribution devices, when the maintenance work is performed.

Thus, the exemplary embodiments provide technology for performing maintenance work safely without defining topology information showing the current relation of connection. Specifically, the technology defines in advance, for each of pairs of device types and event types, a work template corresponding to a topology of relevant device types. Before the maintenance work begins, the technology performs topology discovery (hereafter, referred to simply as "discovery") within layers defined by the topology corresponding to the work template, and issues a work instruction sheet indicating tasks, each for a specified device.

Figure 1:
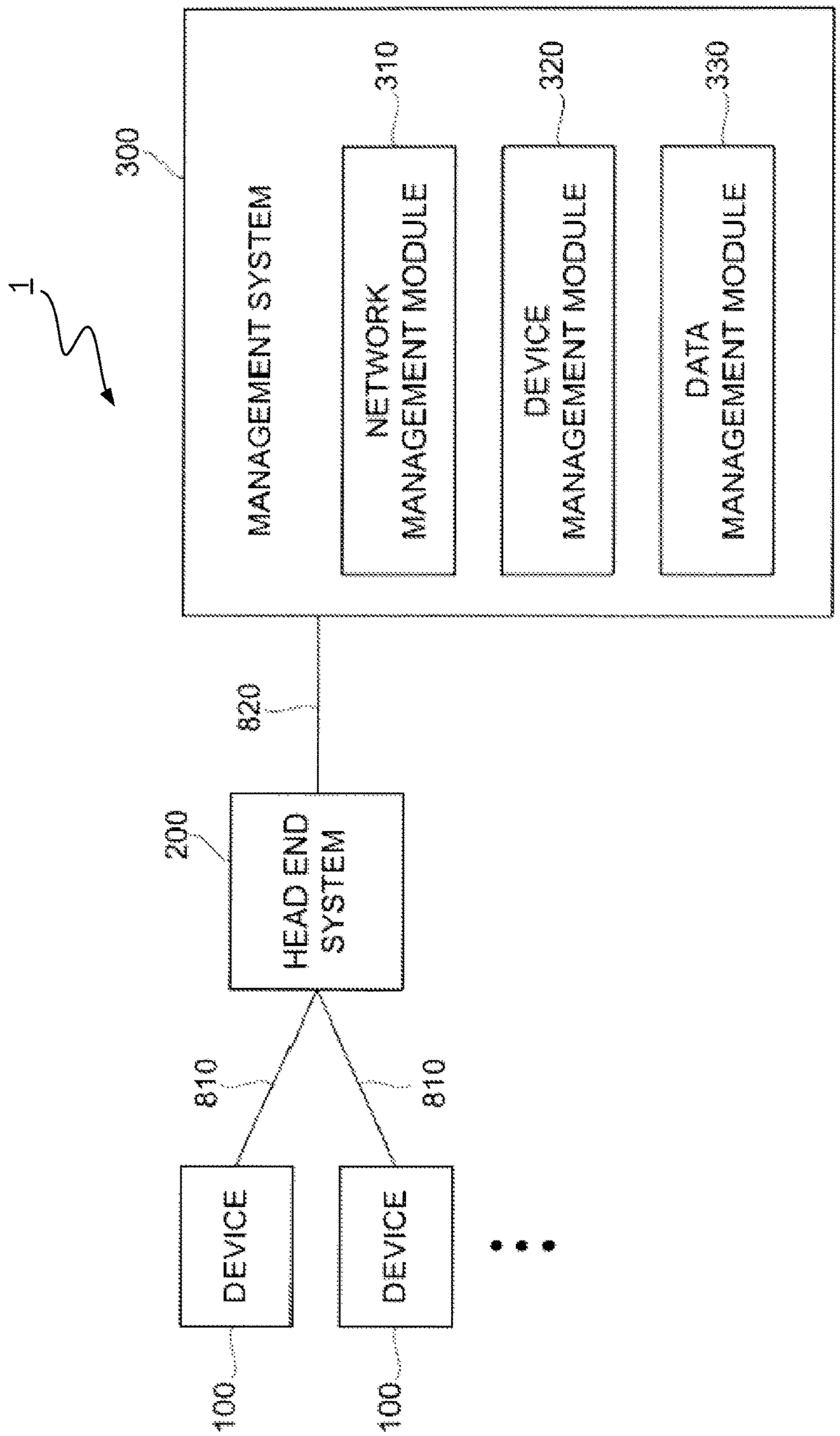
FIG. 1 depicts a block diagram of a network system according to exemplary embodiments of the present invention.

Referring to FIG. 1, there is shown a block diagram of a network system 1 to which the exemplary embodiments are applied. As shown in the figure, the network system 1 may include devices 100, a head end system 200, and a management system 300. Each of the devices 100 may be coupled to the head end system 200 via an information network 810. The number of the devices 100 is not limited to two, and the plural devices 100 more than two may be coupled to the head end system 200. The head end system 200 may be coupled to the management system 300 via an information network 820. In this exemplary embodiment, management system 300, work template 400, and work instruction sheet 500 are stored on computer 90. However, in other embodiments, management system 300, work template 400, and work instruction sheet 500 may be stored externally and accessed through a communication network, such as information network 820. Information network 820 can be, for example, a local area network (LAN), a wide area network (WAN) such as the Internet, or a combination of the two, and may include wired, wireless, fiber optic or any other connection known in the art. In general, information network 820 can be any combination of connections and protocols that will support communications between Computer 90 and management system 300, in accordance with a desired embodiment of the present invention. In addition, the devices 100 may be coupled to each other via an electric power network, which is not shown in the figure.

Each of the devices 100 functions as a power distribution device, such as a smart meter, a distribution board or the like. If each device 100 is a smart meter, the device 100 records meter data, which is digital data indicating electric power consumption, and communicates the meter data to the head end system 200 via the information network 810. On the occurrence of an event such as a failure, the device 100 sends event information including the device ID thereof and the event type of the event to the head end system 200 via the information network 810. Also, each of the devices 100 updates a Management Information Base (MIB) to include information identifying adjacent devices by communicating with the adjacent devices using the Simple Network Management Protocol (SNMP). In response to a request for a discovery procedure, the device 100 sends the result of the discovery procedure, namely, the information identifying the adjacent devices included in the MIB to the head end system 200 via the information network 810.

The head end system 200 controls communication between each of the devices 100 and the management system 300. Specifically, the head end system 200 receives the meter data, the event information and the result of the discovery procedure from each of the devices 100 via the information network 810, and sends them to the management system 300 via the information network 820. Also, the head end system 200 receives the request for the discovery procedure designating a device 100 from the management system 300 via the information network 820, and send the request to the device 100 via the information network 810.

The management system 300 manages the devices 100. The management system 300 may include a network management module 310, a device management module 320, and a data management module 330. The network management module 310 manages network communication in the management system 300. Specifically, the network management module 310 receives the meter data, the event information and the result of the discovery procedure from the head end system 200 via the information network 820, and sends the request for the discovery procedure to the head end system 200 via the information network 820. The device management module 320 manages the devices 100. For example, the device management module 320 may specify the device type on the basis of the device ID. In the exemplary embodiments, the device management module 320 also manages the maintenance work on the devices 100. To allow a worker to perform the maintenance work, the device management module 320 generates a work instruction sheet on the basis of a work template which has been created in advance. The data management module 330 manages the meter data.

Figure 2:
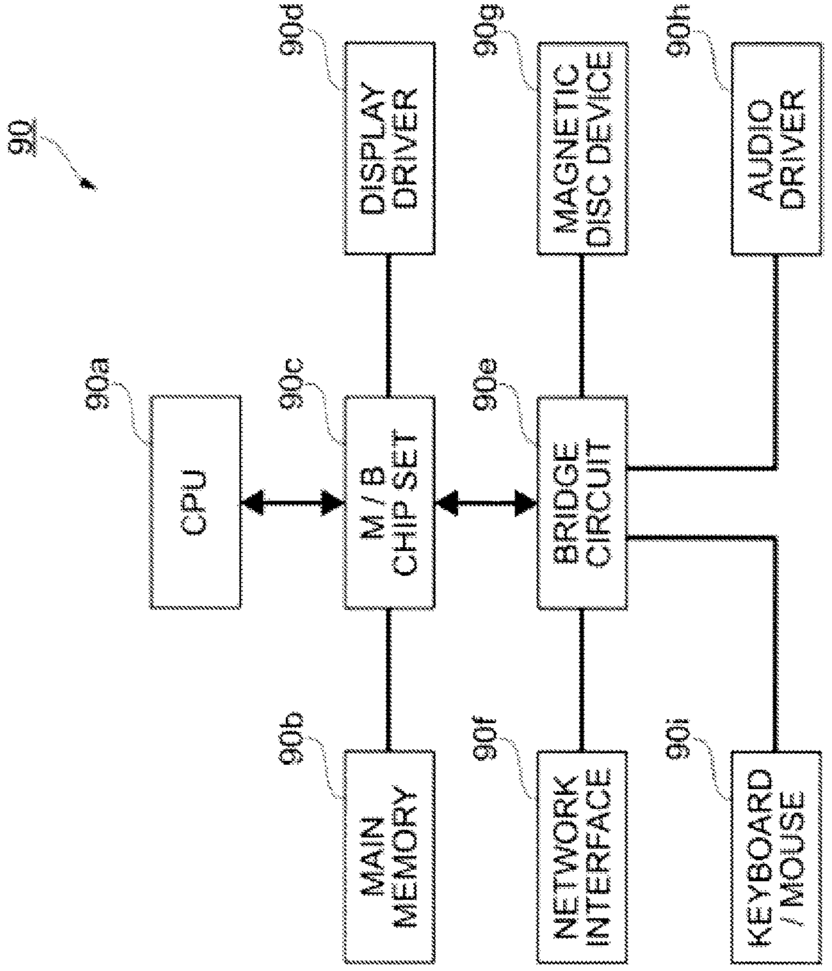
FIG. 2 depicts an example of a hardware configuration of a computer able to implement exemplary embodiments of the present invention.

Referring to FIG. 2, there is shown an example of a hardware configuration of a computer 90 able to implement the exemplary embodiments. As shown in the figure, the computer 90 may include a central processing unit (CPU) 90*a* serving as one example of a processor, a main memory 90*b* connected to the CPU 90*a* via a motherboard (M/B) chip set 90*c* and serving as one example of a memory, and a display driver 90*d* connected to the CPU 90*a* via the same M/B chip set 90*c*. A network interface 90*f*, magnetic disk device 90*g*, audio driver 90*h*, and keyboard/mouse 90*i* are also connected to the M/B chip set 90*c* via a bridge circuit 90*e*.

In FIG. 2, the various configurational elements are connected via buses. For example, the CPU 90*a* and the M/B chip set 90*c*, and the M/B chip set 90*c* and the main memory 90*b* are connected via CPU buses, respectively. Also, the M/B chip set 90*c* and the display driver 90*d* may be connected via an accelerated graphics port (AGP). However, when the display driver 90*d* includes a PCI express-compatible video card, the M/B chip set 90*c* and the video card are connected via a PCI express (PCIe) bus. Also, when the network interface 90*f* is connected to the bridge circuit 90*e*, a PCI Express may be used for the connection, for example. For connecting the magnetic disk device 90*g* to the bridge circuit 90*e*, a serial AT attachment (ATA), a parallel-transmission ATA, or peripheral components interconnect (PCI) may be used. For connecting the keyboard/mouse 90*i* to the bridge circuit 90*e*, a universal serial bus (USB) may be used. Computer 90 may include internal and external hardware components, as depicted and described in further detail with respect to FIG. 8.

Figure 3A:
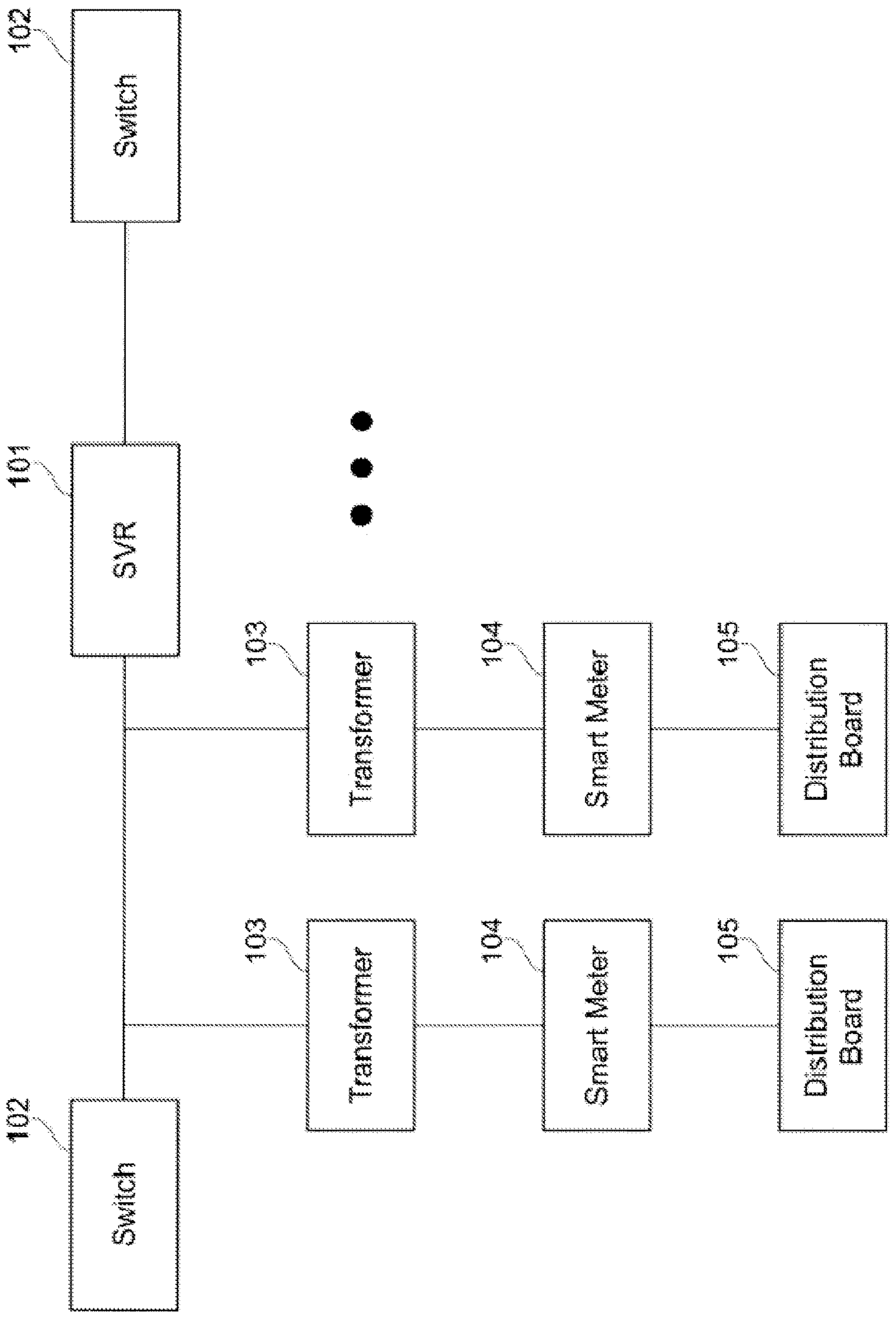
FIG. 3A depicts an example of a power distribution system which distributes electric power to ordinary houses.
Figure 3B:
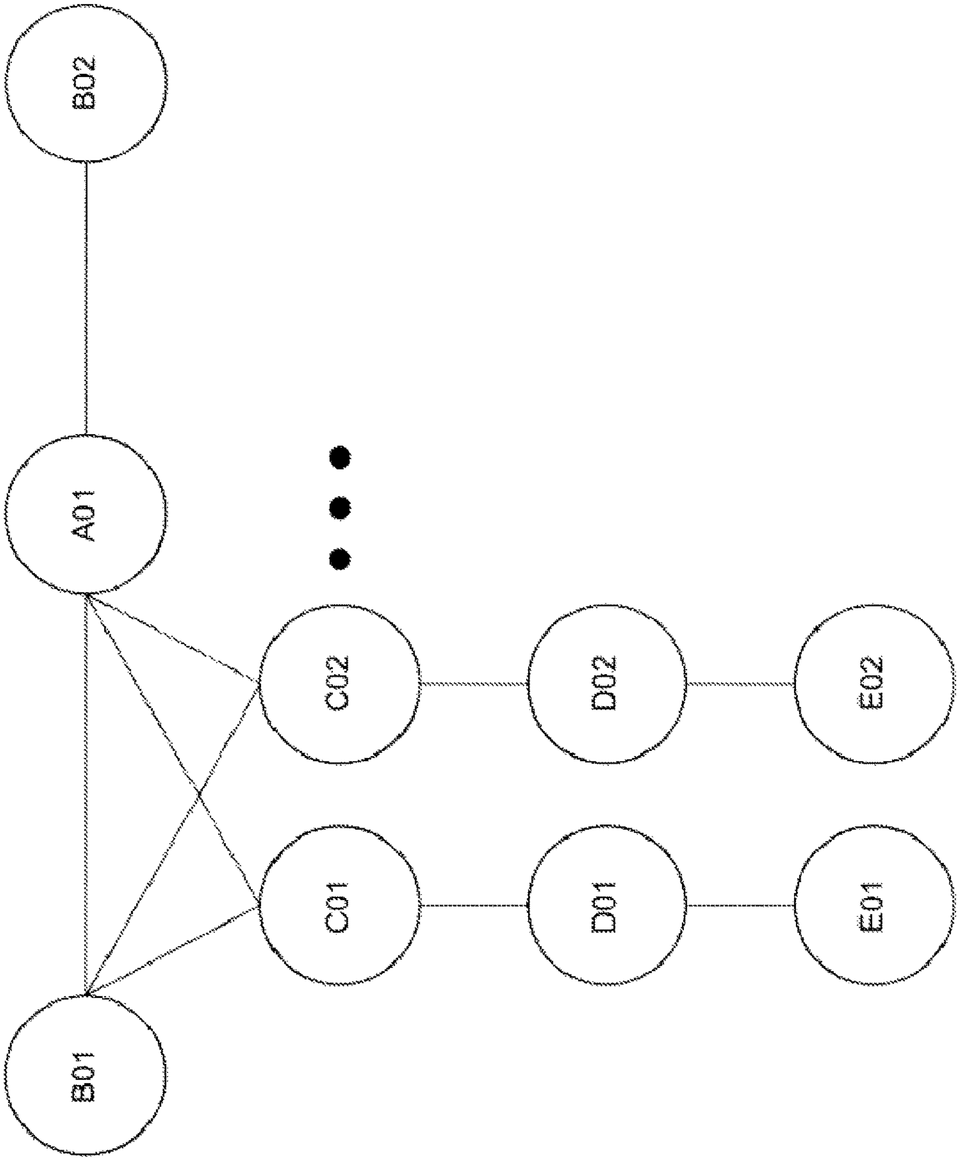
FIG. 3B depicts an example of a topology obtained through a discovery process for the whole of the power distribution system.

Referring to FIGS. 3A and 3B, there are diagrams showing an example of a discovery process.

FIG. 3A shows an example of a power distribution system which distributes electric power to ordinary houses. This power distribution system includes, as examples of devices 100 for power distribution, a step voltage regulator (SVR) 101, switches 102, transformers 103, smart meters 104, and distribution boards 105. The SVR 101 adjusts a voltage of power supply. The switches 102 cut off power supply. The transformers 103 convert the voltage of power supply to a voltage for domestic use. The smart meters 104 measure electric power consumption. The distribution boards 105 cut off power distribution for safety. Note that, in this example, the distribution boards 105 are assumed to have functions for a home energy management system (HEMS). The respective numbers of the transformers 103, the smart meters 104, and the distribution boards 105 are not limited to two, and the plural transformers 103, the plural smart meters 104, and the plural distribution boards 105, each of which are more than two, may be provided.

In the exemplary embodiments, a device type is assigned to each of the devices 100. Specifically, the device type of the SVR 101, the device type of the switches 102, the device type of the transformers 103, the device type of the smart meters 104 and the device type of the distribution boards 105 are assumed to be "A", "B", "C", "D" and "E", respectively. Also, in the exemplary embodiments, the device ID is assigned to each of the devices 100. The device ID may be a character string, of which the initial character indicates the device type of the device identified by the device ID. Specifically, the device ID of the SVR 101 is assumed to be "A01". The device IDs of the switches 102 are assumed to be "B01" and "B02". The device IDs of the transformers 103 are assumed to be "C01", "C02", . . . (hereinafter referred to as "Cxx"). The device IDs of the smart meters 104 are assumed to be "D01", "D02", . . . (hereinafter referred to as "Dxx"). The device IDs of the distribution boards 105 are assumed to be "E01", "E02", . . . (hereinafter referred to as "Exx"). Note that, hereunder, the devices identified by the device IDs "A01", "B01", "B02", "Cxx", "Dxx" and "Exx" are described as device "A01", device "B01", device "B02", device "Cxx", device "Dxx", and device "Exx", respectively.

FIG. 3B shows an example of a topology obtained through a discovery process for the whole of the power distribution system of FIG. 3A. In FIG. 3B, each node in the topology represents a device, which is denoted with its device ID in the figure. Specifically, the node "A01" represents the device "A01", the node "B01" represents the device "B01", the node "B02" represents the device "B02", the nodes "Cxx" represent the devices "Cxx", the nodes "Dxx" represent the devices "Dxx", and the nodes "Exx" represent the devices "Exx". Note that, in FIG. 3B, it is assumed that there is no connection between the devices "Cxx".

Figure 4:
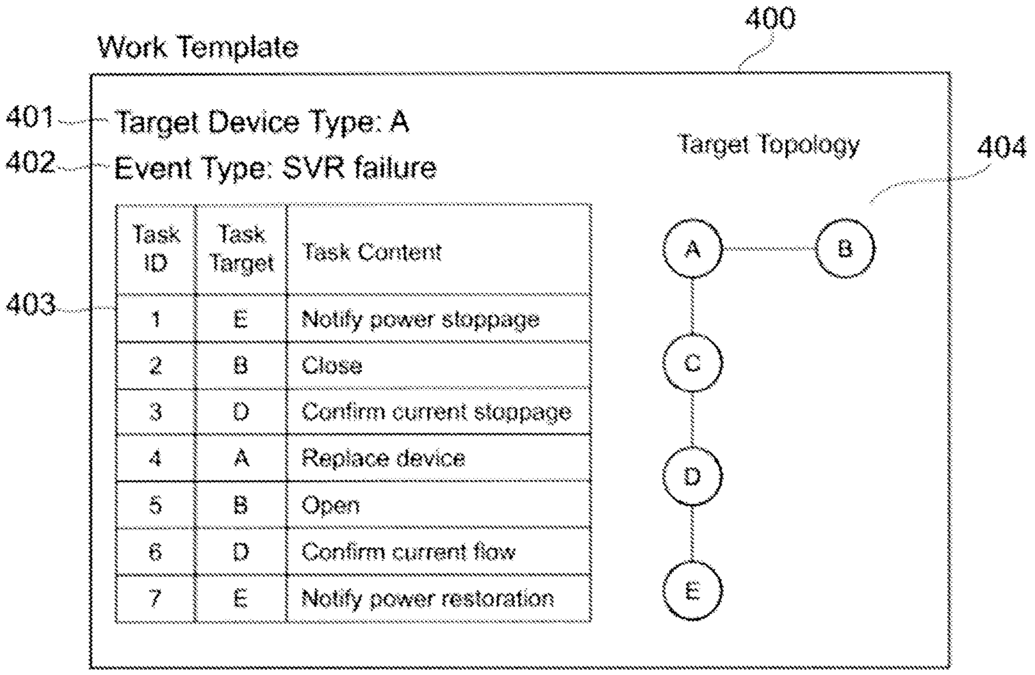
FIG. 4 depicts an example of a work template according to exemplary embodiments of the present invention.

Referring to FIG. 4, there is shown an example of a work template 400. The work template 400 is assumed to be used when the SVR 101 is replaced due to its failure. Therefore, the work template 400 includes a description 401 of a target device type "A", and a description 402 of an event type, which is the SVR failure in this example. Also, the work template 400 includes, as one example of a first sequence, a task template 403 associating a task ID, a task target and a task content. To replace the SVR 101, it is necessary to cut off electric current by closing the switches 102. Since ordinary houses in the same block may be affected by cutting off electric current, it is necessary to measure electric current by the smart meters 104 after replacing the SVR 101 and passing electric current. Therefore, the task template 403 defines the task sequence shown in FIG. 4. Further, the work template 400 includes, as one example of a first topology, a target topology 404. The target topology 404 indicates, as one example of dependency relationship of a plurality of device types, the state in which the top layer corresponds to the target device type, and each layer corresponds to the device type of the device adjacent to the device corresponding to the upper layer of the layer. In the target topology 404, a one-to-many relationship exists only between the top layer and the layer just under the top layer. However, a one-to-many relationship may exist between an arbitrary layer other than the top layer and the layer just under the arbitrary layer.

Figure 5:
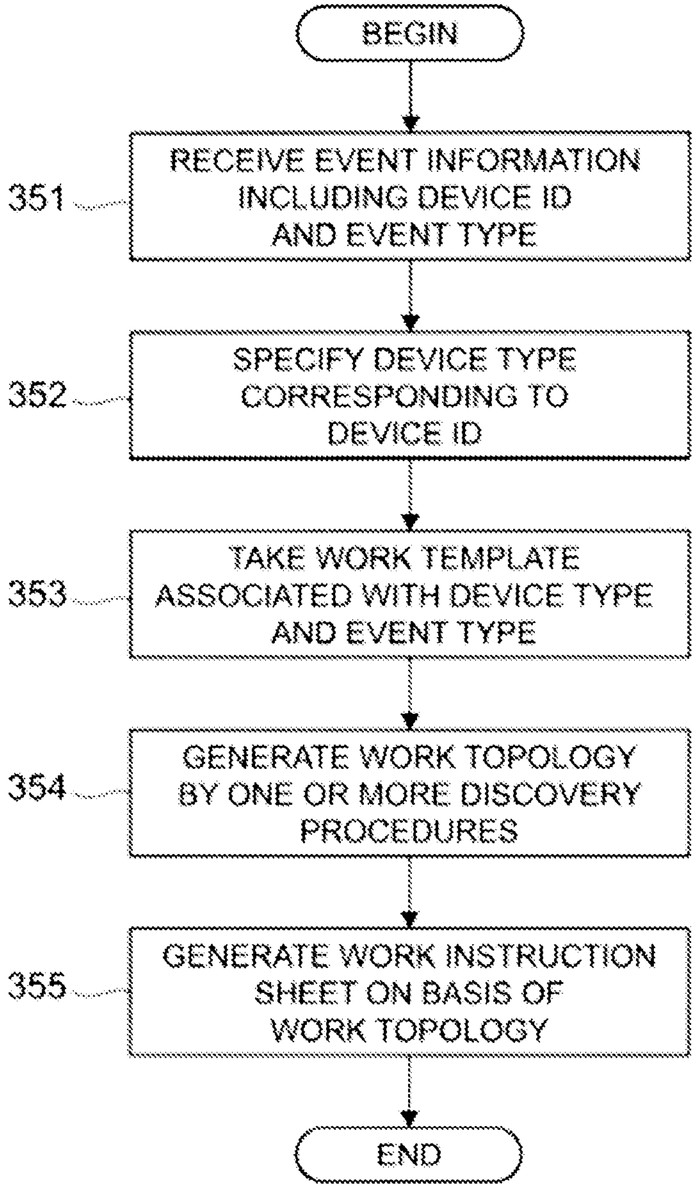
FIG. 5 depicts a flowchart representing an operation of a management system according to exemplary embodiments of the present invention.

Referring to FIG. 5, there is shown a flowchart representing an example of an operation performed by the management system 300.

As shown in the figure, the network management module 310 receives event information including the device ID of the device which has caused an event and the event type of the event from the head end system 200 (step 351). The device ID and the event type are transferred to the device management module 320.

Next, the device management module 320 specifies a device type corresponding to the device ID transferred from the network management module 310 (step 352). For example, the device management module 320 may specify the device type on the basis of the character string representing the device ID. Alternatively, the device management module 320 may specify the device type with reference to correspondence between the device ID and the device type of the device identified by the device ID. Subsequently, the device management module 320 takes a work template associated with the device type specified at step 352 and the event type transferred from the network management module 310 (step 353). The work template is transferred to the network management module 310.

After the work template has been transferred from the device management module 320, the network management module 310 generates a topology for the maintenance work (hereinafter referred to as a "work topology") by one or more discovery procedures (step 354). Specifically, the network management module 310 may first perform a discovery procedure to find adjacent devices to the target device which has caused the event, and may then perform a discovery procedure to find devices adjacent to each of the adjacent devices.

For example, when the device "A01" of FIG. 3B has caused the event, the network management module 310 performs a discovery procedure to find one or more devices adjacent to the device "A01". In FIG. 3B, the network management module 310 finds the devices "B01", "B02" and "Cxx". Since the device type of the devices "B01" and "B02" is "B", and the device type of the devices "Cxx" is "C", the result of the discovery procedure matches the target topology 404 of FIG. 4. The target topology 404 has no node under the node "B". Thus, the network management module 310 does not perform a discovery procedure to find one or more devices adjacent to the devices "B01" and "B02". That is, the network management module 310 does not find the devices "Cxx" as the devices adjacent to the device "B01", unlike in a discovery process for the whole of the topology.

Meanwhile, the network management module 310 performs a discovery procedure to find one or more devices adjacent to the devices "Cxx". In FIG. 3B, the network management module 310 finds the devices "Dxx". Since the device type of the devices "Dxx" is "D", the result of the discovery procedure matches the target topology 404 of FIG. 4. Subsequently, the network management module 310 performs a discovery procedure to find one or more devices adjacent to the devices "Dxx". In FIG. 3B, the network management module 310 finds the devices "Exx". Since the device type of the devices "Exx" is "E", the result of the discovery procedure matches the target topology 404 of FIG. 4. The target topology 404 has no node under the node "E". Thus, the network management module 310 does not perform a discovery procedure to find one or more devices adjacent to the devices "Exx". The work topology thus generated is transferred to the device management module 320.

Finally, the device management module 320 generates a work instruction sheet on the basis of the work topology generated at step 354 (step 355). Specifically, the device management module 320 sets the device ID of the target device in the work instruction sheet. For example, when generating the work instruction sheet on the basis of the work template 400 of FIG. 4, the device management module 320 sets "A01" in the work instruction sheet. Also, the device management module 320 assigns each of the devices 100 in the work topology to one or more tasks in the task template. That is, the device management module 320 replaces, in the task target of the task template, an individual device type of plural device types in the target topology with the device 100 having the individual device type. For example, in the task template 403, the device management module 320 replaces "A" with "A01", "B" with "B01" and "B02", "D" with "Dxx", and "E" with "Exx", respectively.

Referring to FIG. 6, there is shown an example of the work instruction sheet 500 generated at step 355 of FIG. 5. The work instruction sheet 500 includes a description 501 of the device ID of the target device. In the description 501, the device ID of the target device is "A01". Also, the work instruction sheet 500 includes, as one example of a second sequence or an operation sequence, task instructions 502 associating a task ID, a task target and a task content. In the task instructions 502, the result of replacing "A" with "A01" is represented by the row in which the task ID is "4-1". The result of replacing "B" with "B01" and "B02" is represented by the rows in which the task IDs are "2-1", "2-2", "5-1" and "5-2". The result of replacing "D" with "Dxx" is represented by the rows in which the task IDs are "3-1", "3-2", . . . and "6-1", "6-2", . . . . The result of replacing "E" with "Exx" is represented by the rows in which the task IDs are "1-1", "1-2", . . . and "7-1", "7-2", . . . . Further, the work instruction sheet 500 may include, as one example of a second topology, the work topology 503 generated at step 354 of FIG. 5.

The work instruction sheet 500 may be sent to, for example, a portable terminal used by a worker. The worker may perform maintenance work on the target device with reference to the work instruction sheet 500. Note that, since the current topology may be different from the topology at a time when the work instruction sheet 500 has been generated. Therefore, a discovery process may be inserted before the maintenance work. After the maintenance work, the device ID of the target device may be automatically registered with a database.

In the above description, the work template 400 is assumed to be created manually. However, creating the work template 400 manually causes a problem. For example, the number of patterns of target topologies may be very large depending on the number of the device types and the number of the layers to be set in the target topologies. As a result, finding the patterns of target topologies and defining tasks may become difficult. Thus, in the exemplary embodiments, the work template 400 may be generated by software processing.

Figure 7A:
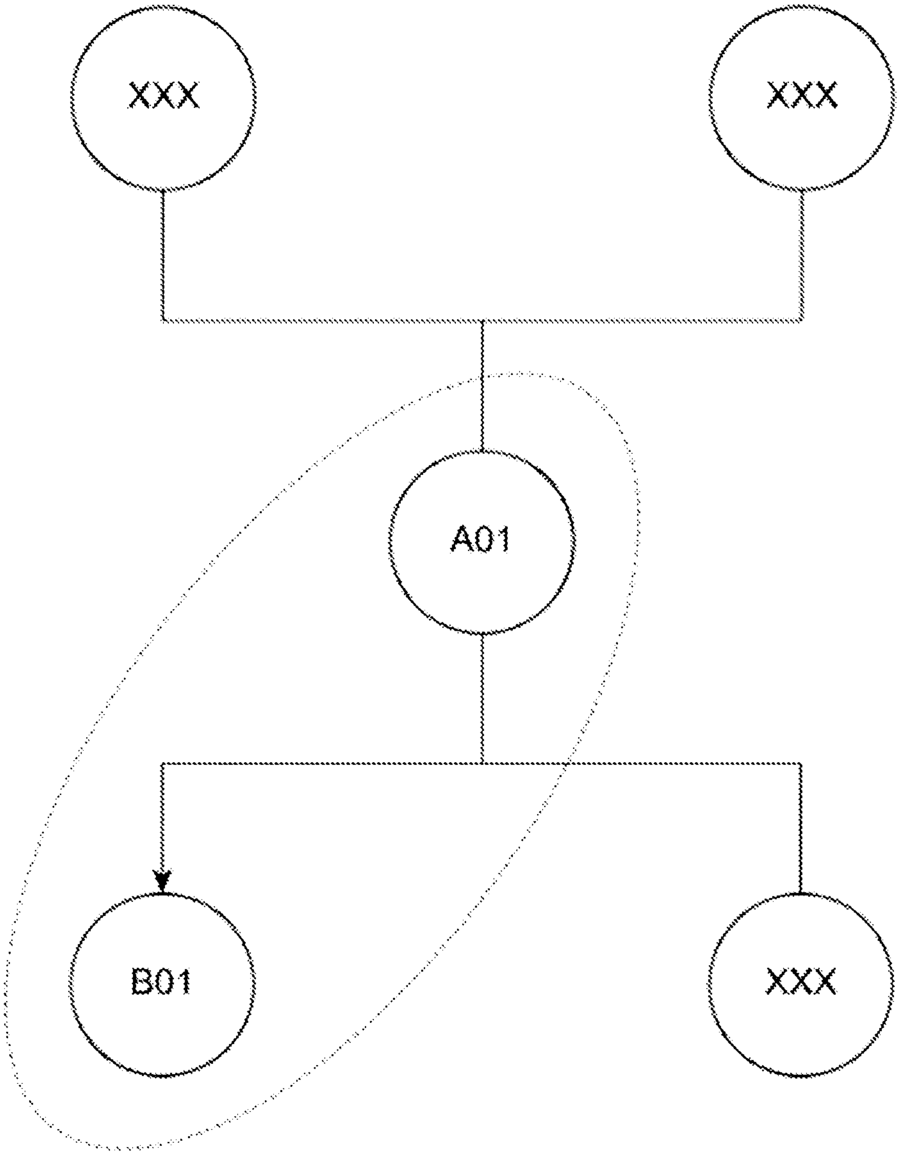
FIG. 7A depicts an example of an actual topology for explaining a process of generating the work template by software processing.
Figure 7B:
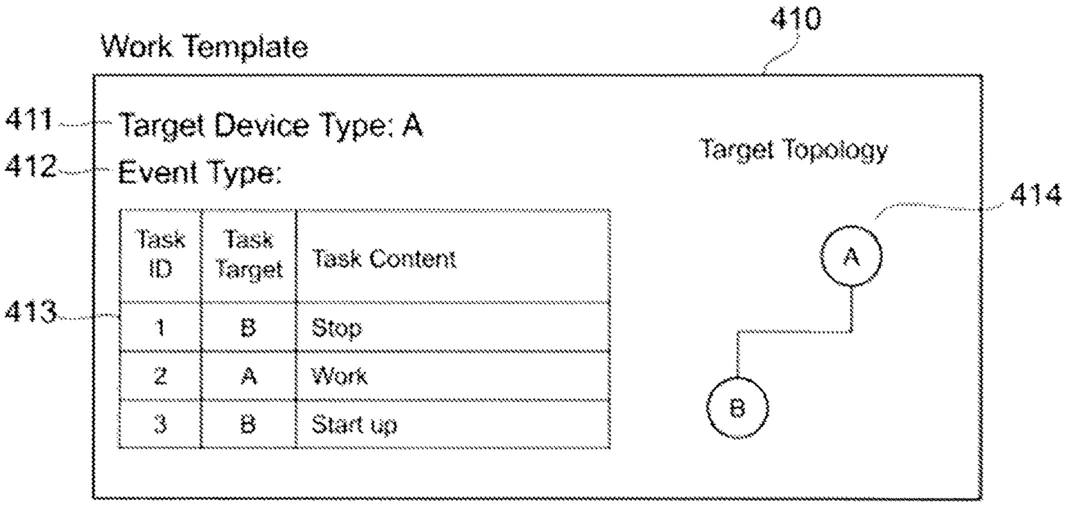
FIG. 7B depicts an example of an interim version of a work template for explaining a process of generating the work template by software processing.
Figure 7C:
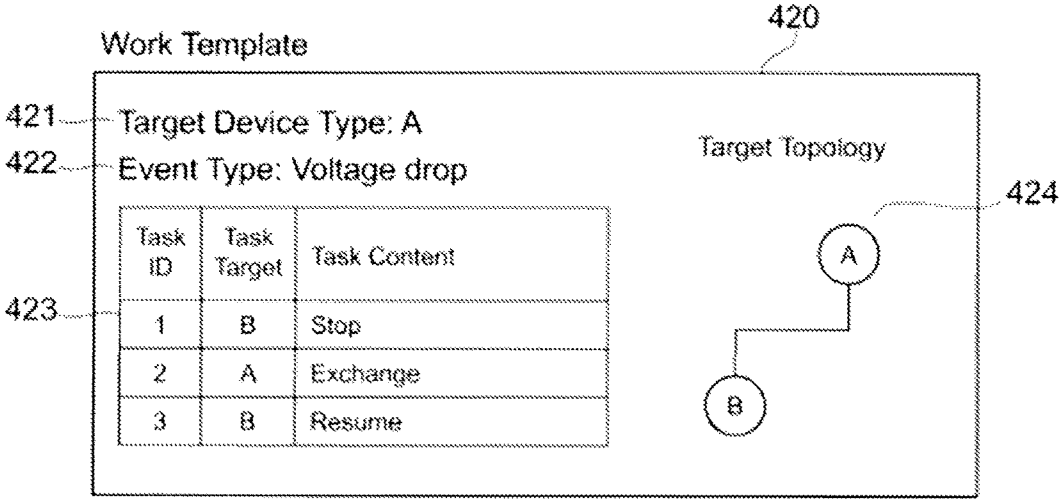
FIG. 7C depicts an example of a finished version of a work template for explaining a process of generating the work template by software processing.

Referring to FIGS. 7A, 7B and 7C, there are diagrams showing an example of a process of generating the work template by software processing. It is assumed hereinafter that the device management module 320 generates the work template.

FIG. 7A shows an example of an actual topology including the target device "A01" and four devices adjacent to the target device "A01". In FIG. 7A, the device management module 320 specifies one or more devices to be affected by the stop of the target device "A01". Specifically, the device management module 320 may specify the devices on the basis of a rule set in advance. The rule may be that dependency relationship exists between a device with the device type of "A" and a device with the device type of "B".

In FIG. 7A, the device management module 320 specifies, on the basis of the rule, the pair of the devices "A01" and "B01", encircled by a dashed ellipse. Thus, the device management module 320 specifies the device "B01" as the device to be affected by the stop of the target device "A01". Alternatively, the device management module 320 may specify all the devices connected to the target device "A01". In this case, the device management module 320 specifies not only the device "B01", but also three devices indicated by "xxx".

FIG. 7B shows an example of a work template 410 which is an interim version of a work template generated from a blank version of a work template. To generate the work template 410, the device management module 320 sets a description 411 of the target device type "A" in the blank version. The device type "A" may be derived from the device ID of the target device (i.e., "A01"). To generate the work template 410, the device management module 320 sets a description 412 with no event type, in the blank version. Also, to generate the work template 410, the device management module 320 creates and sets a task template 413 in the blank version. Specifically, the device management module 320 may create the task template 413 on the basis of a rule set in advance. The rule may be that a child node device needs to be stopped before the maintenance work on the parent node device if dependency relationship exists between the parent node device type of the parent node device and the child node device type of the child node device. Note that, although the task template 413 shows only one task content for one task ID, plural task contents each corresponding to an event type may be prepared for one task ID. Further, to generate the work template 410, the device management module 320 sets a target topology 414 extracted from the actual topology as shown in FIG. 7A.

FIG. 7C shows an example of a work template 420 which is a finished version of a work template generated from the work template 410. A description 421 is identical to the description 411 already set in the work template 410 of FIG. 7B. To generate the work template 420, the device management module 320 creates a description 422 by setting an event type "Voltage drop" in the description 412 of the work template 410. The event type "Voltage drop" may be selected from plural event types. Also, to generate the work template 420, the device management module 320 creates a task template 423 by changing one or more task contents in the task template 413 of the work template 410. Specifically, when the event type "Voltage drop" is selected, the device management module 320 may change "Work" and "Start up" to "Exchange" and "Resume" respectively, as task contents corresponding to the event type "Voltage drop", in the task template 413 of the work template 410. Further, a target topology 424 is identical to the target topology 414 already set in the work template 410 of FIG. 7B.

Note that, there may be a case in which the management system 300 fails to perform the discovery procedure for the device 100 due to an abnormality in communication function of the device 100. The following will describe an alternative embodiment for generating the work instruction sheet in this case.

In the alternative embodiment, the management system 300 distributes in advance the work template to the device 100 of which the device type is the target device type corresponding to the work template. For example, when the actual topology is as shown in FIG. 3B, the management system 300 distributes in advance the work template 400 of FIG. 4 to the device "A01". Next, the device "A01", which has received the work template 400, generates periodically the work topology 503 by performing a discovery process for the layers defined by the target topology 404 corresponding to the work template 400. For example, the device "A01" generates the work topology 503 by performing a discovery process for the devices "B01", "B02", "Cxx", "Dxx" and "Exx". Subsequently, the device "A01" stores the work topology in a portable storage medium.

After that, on the occurrence of the abnormality in communication function of the device 100, a worker may insert the portable storage medium into a portable terminal, as one example of a terminal, before the maintenance work. The portable terminal issues the work instruction sheet on the basis of the work topology stored in the portable storage medium.

Note that, in the exemplary embodiments, the target topology and the work topology are assumed to be tree-structured topologies, but are not limited thereto. These topologies may be star-structured topologies, ring-structured topologies, mesh-structured topologies or the like.

Also, in the exemplary embodiments, the devices are assumed to be used for power distribution, but are not limited thereto. The devices may be used for any other purpose. In this case, the maintenance work of the devices may be more generally defined as the operation of the devices. Further, the worker who performs the maintenance work may be more generally defined as the operator who performs the operation.

Figure 8:
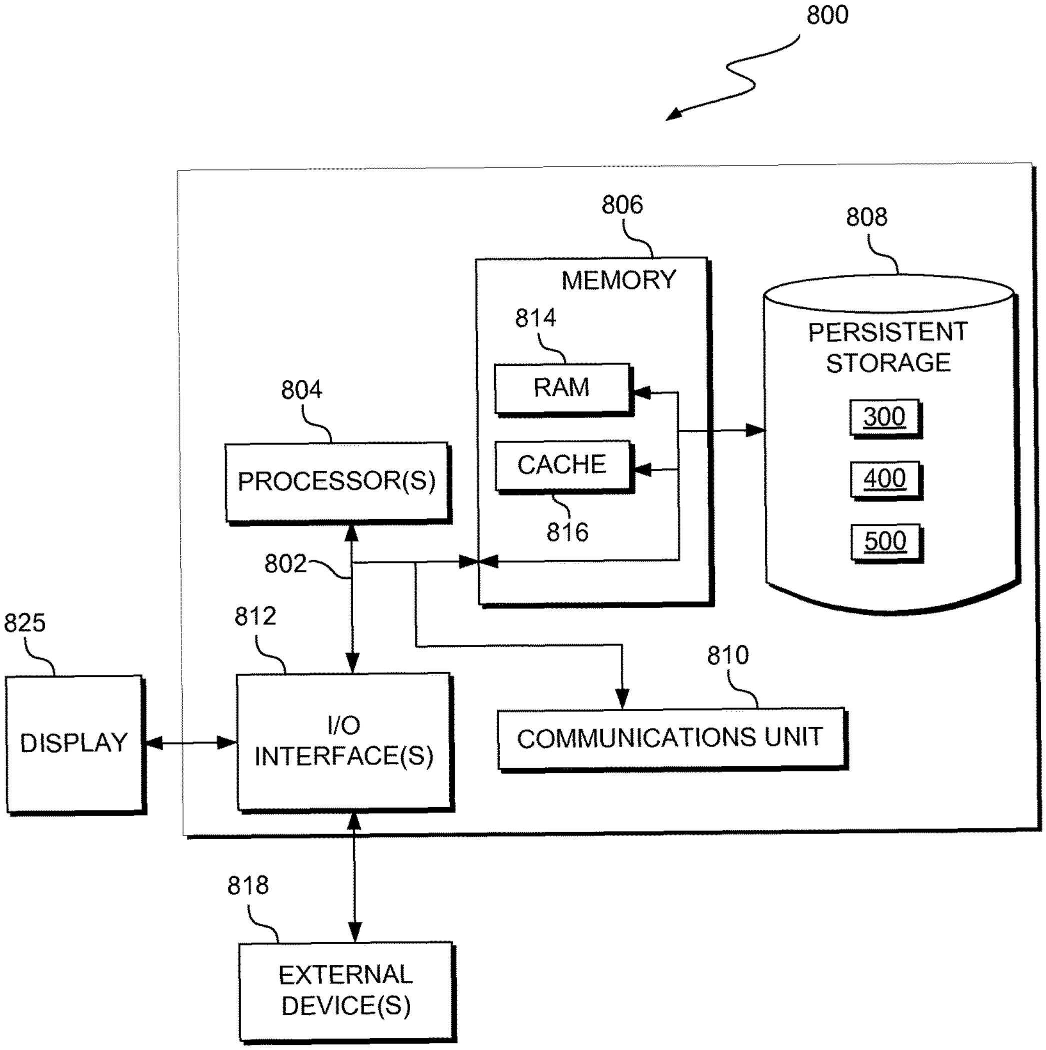
FIG. 8 depicts a block diagram of components of the computing device executing processes of the management system, in accordance with an exemplary embodiment of the present invention.

FIG. 8 depicts a block diagram, 800, of components of computer 90, in accordance with an illustrative embodiment of the present invention. It should be appreciated that FIG. 8 provides only an illustration of one implementation and does not imply any limitations with regard to the environments in which different embodiments may be implemented. Many modifications to the depicted environment may be made.

Computer 90 includes communications fabric 802, which provides communications between computer processor(s) 804, memory 806, persistent storage 808, communications unit 810, and input/output (I/O) interface(s) 812. Communications fabric 802 can be implemented with any architecture designed for passing data and/or control information between processors (such as microprocessors, communications and network processors, etc.), system memory, peripheral devices, and any other hardware components within a system. For example, communications fabric 802 can be implemented with one or more buses.

Memory 806 and persistent storage 808 are computer-readable storage media. In this embodiment, memory 806 includes random access memory (RAM) 814 and cache memory 816. In general, memory 806 can include any suitable volatile or non-volatile computer-readable storage media.

Management system 300, work template 400, and work instruction sheet 500 are stored in persistent storage 808 for execution and/or access by one or more of the respective computer processors 804 via one or more memories of memory 806. In this embodiment, persistent storage 808 includes a magnetic hard disk drive. Alternatively, or in addition to a magnetic hard disk drive, persistent storage 808 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 808 may also be removable. For example, a removable hard drive may be used for persistent storage 808. Other examples include optical and magnetic disks, thumb drives, and smart cards that are inserted into a drive for transfer onto another computer-readable storage medium that is also part of persistent storage 808.

Communications unit 810, in these examples, provides for communications with other data processing systems or devices, including resources of information network 820 shown in FIG. 1. In these examples, communications unit 810 includes one or more network interface cards. Communications unit 810 may provide communications through the use of either or both physical and wireless communications links. Management system 300, work template 400, and work instruction sheet 500 may be downloaded to persistent storage 808 through communications unit 810.

I/O interface(s) 812 allows for input and output of data with other devices that may be connected to computer 90. For example, I/O interface 812 may provide a connection to external devices 818 such as a keyboard, keypad, a touch screen, and/or some other suitable input device. External devices 818 can also include portable computer-readable storage media such as, for example, thumb drives, portable optical or magnetic disks, and memory cards. Software and data used to practice embodiments of the present invention, e.g., management system 300, work template 400, and work instruction sheet 500, can be stored on such portable computer-readable storage media and can be loaded onto persistent storage 808 via I/O interface(s) 812. I/O interface(s) 812 also connect to a display 825.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for supporting an operation by an operator of a target device, the method comprising:

storing, in advance, by one or more processors, a first topology as a template indicating dependency relationship of a plurality of device types including a device type of the target device;

responsive to an event occurring with the target device, generating, by the one or more processors, a second topology indicating dependency relationship of a plurality of devices including the target device and one or more devices adjacent to the target device, by performing, based on the first topology, a topology discovery for the plurality of devices, each of the plurality of devices having any one of the plurality of device types; and providing, by the one or more processors, an operation sequence of the plurality of devices to the operator, the operation sequence being generated based on the second topology.

2. The method of claim 1, further comprising:

storing, by the one or more processors, a first sequence indicating a sequence of operations, each of the operations corresponding to any one of the plurality of device types; and generating, by the one or more processors, as the operation sequence, a second sequence indicating a sequence of operations, by replacing, based on the second topology, an individual device type of the plurality of device types with the device having the individual device type, each of the operations corresponding to any one of the plurality of devices.

3. The method of claim 2, further comprising:

associating, by the one or more processors, the first topology and the first sequence with the device type of the target device and an event type of the event to occur in the target device; and specifying, by the one or more processors, the first topology and the first sequence associated with the device type and the event type, when the event has occurred in the target device.

4. The method of claim 2, further comprising:

generating, by the one or more processors, the first topology, based on a rule stating that dependency relationship exists between any two device types of the plurality of device types; and generating, by the one or more processors, the first sequence, based on a rule stating that an operation of a child node device is to be performed before an operation of a parent node device, the child node device having a child node device type included in the two device types, the parent node device having a parent node device type included in the two device types.

5. The method of claim 1, wherein the storing, the generating and the providing are executed by a management system managing the plurality of devices.

6. The method of claim 1, wherein i) storing and the generating processes are executed by the target device, and ii) providing processes are executed by a terminal which has received the second topology from the target device via a portable storage medium, in response to a request of the operator.

7. The method of claim 1, wherein i) the plurality of devices are installed for electric power distribution, and ii) the dependency relationship of the plurality of devices indicates that an operation of one device of the plurality of devices is to be performed before an operation of another device of the plurality of devices for safety purposes.

8. A computer program product for supporting an operation by an operator of a target device, the computer program product comprising:

one or more computer-readable storage media and program instructions stored on the one or more computer-readable storage media, the program instructions comprising:

program instructions to store, in advance, a first topology as a template indicating dependency relationship of a plurality of device types including a device type of the target device;

program instructions to generate, in response to an event occurring with the target device, a second topology indicating dependency relationship of a plurality of devices including the target device and one or more devices adjacent to the target device, by performing, based on the first topology, a topology discovery for the plurality of devices, each of the plurality of devices having any one of the plurality of device types; and program instructions to provide an operation sequence of the plurality of devices to the operator, the operation sequence being generated based on the second topology.

9. The computer program product of claim 8, further comprising:

program instructions to store a first sequence indicating a sequence of operations, each of the operations corresponding to any one of the plurality of device types; and program instructions to generate, as the operation sequence, a second sequence indicating a sequence of operations, by replacing, based on the second topology, an individual device type of the plurality of device types with the device having the individual device type, each of the operations corresponding to any one of the plurality of devices.

10. The computer program product of claim 9, further comprising:

program instructions to associate the first topology and the first sequence with the device type of the target device and an event type of the event to occur in the target device; and program instructions to specify the first topology and the first sequence associated with the device type and the event type, when the event has occurred in the target device.

11. The computer program product of claim 9, further comprising:

program instructions to generate the first topology, based on a rule stating that dependency relationship exists between any two device types of the plurality of device types; and program instructions to generate the first sequence, based on a rule stating that an operation of a child node device is to be performed before an operation of a parent node device, the child node device having a child node device type included in the two device types, the parent node device having a parent node device type included in the two device types.

12. The computer program product of claim 8, wherein the storing, the generating and the providing are executed by a management system managing the plurality of devices.

13. The computer program product of claim 8, wherein i) storing and the generating processes are executed by the target device, and ii) providing processes are executed by a terminal which has received the second topology from the target device via a portable storage medium, in response to a request of the operator.

14. The computer program product of claim 8, wherein i) the plurality of devices are installed for electric power distribution, and ii) the dependency relationship of the plurality of devices indicates that an operation of one device of the plurality of devices is to be performed before an operation of another device of the plurality of devices for safety purposes.

15. A computer system for supporting an operation by an operator of a target device, the computer system comprising:

one or more computer processors;

one or more computer readable storage medium;

program instructions stored on the computer readable storage medium for execution by at least one of the one or more processors, the program instructions comprising:

program instructions to store in advance a first topology as a template indicating dependency relationship of a plurality of device types including a device type of the target device;

program instructions to generate, in response to an event occurring with the target device, a second topology indicating dependency relationship of a plurality of devices including the target device and one or more devices adjacent to the target device, by performing, based on the first topology, a topology discovery for the plurality of devices, each of the plurality of devices having any one of the plurality of device types; and program instructions to provide an operation sequence of the plurality of devices to the operator, the operation sequence being generated based on the second topology.

16. The computer system of claim 15, further comprising:

program instructions to store a first sequence indicating a sequence of operations, each of the operations corresponding to any one of the plurality of device types; and program instructions to generate, as the operation sequence, a second sequence indicating a sequence of operations, by replacing, based on the second topology, an individual device type of the plurality of device types with the device having the individual device type, each of the operations corresponding to any one of the plurality of devices.

17. The computer system of claim 16, further comprising:

program instructions to associate the first topology and the first sequence with the device type of the target device and an event type of the event to occur in the target device; and program instructions to specify the first topology and the first sequence associated with the device type and the event type, when the event has occurred in the target device.

18. The computer system of claim 16, further comprising:

program instructions to generate the first topology, based on a rule stating that dependency relationship exists between any two device types of the plurality of device types; and program instructions to generate the first sequence, based on a rule stating that an operation of a child node device is to be performed before an operation of a parent node device, the child node device having a child node device type included in the two device types, the parent node device having a parent node device type included in the two device types.

19. The computer system of claim 15, wherein i) storing and the generating processes are executed by the target device, and ii) providing processes are executed by a terminal which has received the second topology from the target device via a portable storage medium, in response to a request of the operator.

20. The computer system of claim 15, wherein i) the plurality of devices are installed for electric power distribution, and ii) the dependency relationship of the plurality of devices indicates that an operation of one device of the plurality of devices is to be performed before an operation of another device of the plurality of devices for safety purposes.

* * * * *